(12) United States Patent
Moon et al.

(10) Patent No.: US 11,935,296 B2
(45) Date of Patent: Mar. 19, 2024

(54) APPARATUS AND METHOD FOR ONLINE ACTION DETECTION

(71) Applicant: Electronics and Telecommunications Research Institute, Daejeon (KR)

(72) Inventors: Jin Young Moon, Daejeon (KR); Hyung Il Kim, Daejeon (KR); Jong Youl Park, Daejeon (KR); Kang Min Bae, Daejeon (KR); Ki Min Yun, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 72 days.

(21) Appl. No.: 17/411,728

(22) Filed: Aug. 25, 2021

(65) Prior Publication Data

US 2022/0067382 A1 Mar. 3, 2022

(30) Foreign Application Priority Data

Aug. 25, 2020 (KR) .......................... 10-2020-0106794

(51) Int. Cl.
*G06V 20/40* (2022.01)
(52) U.S. Cl.
CPC .............. *G06V 20/41* (2022.01); *G06V 20/46* (2022.01); *G06V 20/49* (2022.01)
(58) Field of Classification Search
CPC ........ G06V 20/41; G06V 20/46; G06V 20/49; G06V 20/44; G06V 40/20; G06T 2207/10016; G06T 2207/20024
See application file for complete search history.

(56) References Cited

U.S. PATENT DOCUMENTS

| | | | |
|---|---|---|---|
| 9,721,097 B1* | 8/2017 | Davis | G06N 3/045 |
| 9,886,623 B2 | 2/2018 | Kim | |
| 10,021,306 B2* | 7/2018 | Shiraki | G06T 7/20 |
| 2009/0274364 A1* | 11/2009 | Shakya | G06V 20/40 382/165 |
| 2010/0316131 A1* | 12/2010 | Shanableh | H04N 19/61 375/E7.011 |
| 2010/0329563 A1* | 12/2010 | Luo | H04N 21/44008 382/218 |
| 2016/0088355 A1* | 3/2016 | Zubarieva | H04N 21/8133 725/19 |
| 2017/0228618 A1* | 8/2017 | Jiang | G06F 16/70 |
| 2019/0108399 A1 | 4/2019 | Escorcia et al. | |
| 2020/0074158 A1 | 3/2020 | Kim et al. | |

(Continued)

FOREIGN PATENT DOCUMENTS

| | | |
|---|---|---|
| KR | 10-2013-0091596 | 8/2013 |
| KR | 10-1675692 | 11/2016 |

(Continued)

*Primary Examiner* — Santiago Garcia
(74) *Attorney, Agent, or Firm* — KILE PARK REED & HOUTTEMAN PLLC

(57) ABSTRACT

Provided is an apparatus for online action detection, the apparatus including a feature extraction unit configured to extract a chunk-level feature of a video chunk sequence of a streaming video, a filtering unit configured to perform filtering on the chunk-level feature, and an action classification unit configured to classify an action class using the filtered chunk-level feature.

12 Claims, 9 Drawing Sheets

(56) References Cited

U.S. PATENT DOCUMENTS

| | | | | |
|---|---|---|---|---|
| 2021/0044864 A1* | 2/2021 | Begun | ............... | G06V 40/172 |
| 2021/0327076 A1* | 10/2021 | Sun | ............... | G06V 10/40 |
| 2022/0078530 A1* | 3/2022 | Zhu | ............... | H04N 21/26603 |
| 2022/0189209 A1* | 6/2022 | Song | ............... | G06V 40/23 |
| 2022/0365993 A1* | 11/2022 | Voisin | ............... | G06F 18/214 |

FOREIGN PATENT DOCUMENTS

| | | |
|---|---|---|
| KR | 10-2008290 | 8/2019 |
| KR | 10-2134902 | 7/2020 |

* cited by examiner

EXAMPLE OF RELEVANCE GROUND-TRUTH
IN CASE OF ACTION AT CURRENT POINT IN TIME

EXAMPLE OF RELEVANCE GROUND-TRUTH
IN CASE OF BACKGROUND AT CURRENT POINT IN TIME

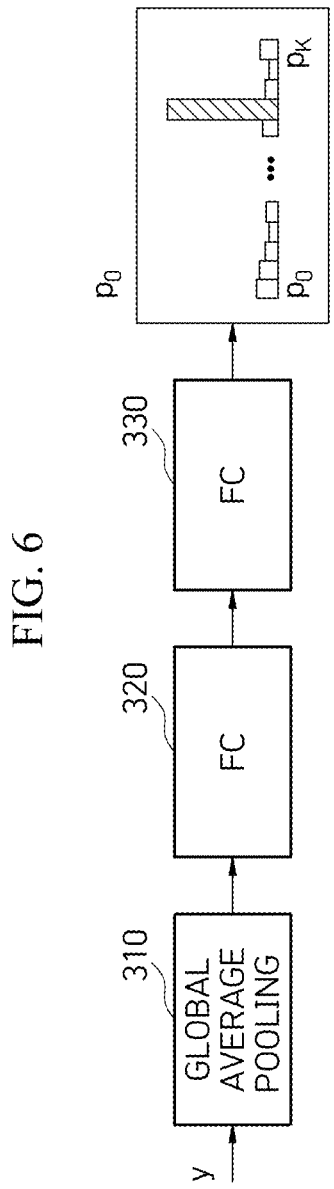

APPARATUS AND METHOD FOR ONLINE ACTION DETECTION

CROSS-REFERENCE TO RELATED APPLICATION

This application claims priority to and the benefit of Korean Patent Application No. 10-2020-0106794, filed on Aug. 25, 2020, the disclosure of which is incorporated herein by reference in its entirety.

BACKGROUND

1. Field of the Invention

The present invention relates to an apparatus and method for online action detection.

2. Discussion of Related Art

According to the related art, a technology of detecting an online action in a streaming video including a background is required to use visual information from a previous time to a current time to detect an action at a current point in time, but there is a difficulty in filtering only the visual information related to a current action.

SUMMARY OF THE INVENTION

The present invention is directed to solving the existing problems by an apparatus and method for online action detection capable of detecting a current action by emphasizing visual information related to the current action and filtering visual information unrelated to the current action through a temporal action modeling in a streaming video.

The technical objectives of the present invention are not limited to the above, and other objectives may become apparent to those of ordinary skill in the art based on the following description.

According to one aspect of the present invention, there is provided an apparatus for online action detection, the apparatus including a feature extraction unit configured to extract a chunk-level feature of a video chunk sequence of a streaming video, a filtering unit configured to perform filtering on the chunk-level features, and an action classification unit configured to classify an action class using the filtered chunk-level features.

The feature extraction unit may include a video frame extraction unit configured to extract frames from a video segment, a single chunk feature generation unit configured to generate a single chunk feature for each chunk, and a chunk-level feature extraction unit configured to generate a chunk-level feature sequence using the single chunk features.

The video frame extraction unit may divide a video segment from a previous time to a current time to be processed into video chunks of the same length and extract frames from the video segment corresponding to a preset number of the chunks.

The video frame extraction unit may extract each frame from the video segment or extract a red-green-blue (RGB) frame or a flow frame(optical flow frame) through sampling.

The filtering unit may perform the filtering using relevance between the chunk-level past information and current information of an ongoing action.

The filtering unit may receive the chunk-level feature sequence and infer a relation of an action instance represented by a current chunk and other chunks to generate a filtered chunk-level feature sequence to be used for action classification.

The action classification unit may acquire an action class probability for a current action included in the input video segment.

The action classification unit may receive the filtered chunk-level feature sequence and output the action class probability of a current action for each class including action classes and a background.

According to another aspect of the present invention, there is provided a method of online action detection, the method including the steps of (a) extracting a chunk-level feature of a video chunk sequence of a streaming video, (b) performing filtering on the chunk-level features of the input video segment, and (c) classifying an action class and outputting an action class probability using the chunk-levels feature filtered in the step (b).

The step (a) may include extracting frames from a video segment, generating a single chunk feature for each chunk, and generating a chunk-level feature sequence using the single chunk features.

The step (a) may include dividing a video segment from a previous time to a current time into video chunks of the same length and extracting each frame from the video segment corresponding to a preset number of the chunks or extracting frames through sampling.

The step (b) may include performing the filtering using relevance between the chunk-level feature and an action instance.

The step (b) may include receiving the chunk-level feature sequence and inferring a relation of an action instance represented by a current chunk and other chunks to generate a filtered chunk-level feature sequence to be used for action classification.

The step (c) may include receiving the filtered chunk-level feature sequence and outputting the action class probability of a current point in time for each class including the action class and a background.

According to another aspect of the present invention, there is provided an apparatus for online action detection including an input unit configured to receive a video chunk sequence of a streaming video, a memory in which a program for detecting an action using the video chunk sequence is stored, and a processor configured to execute the program, wherein the processor extracts a chunk-level feature of the video chunk sequence, performs filtering on the chunk-level feature to generate a chunk-level feature sequence to be used for action classification, and classifies an action class and outputs an action class probability using the chunk-level feature sequence.

The processor may extract frames from a video segment corresponding to chunks, generate a single chunk feature for each chunk, and generate the chunk-level feature sequence using the single chunk features.

The processor may infer a relation of an action instance represented by a current chunk and other chunks using the chunk-level feature sequence to generate the chunk-level feature sequence.

The processor may output the action class probability of a current point in time for each class including the action class and a background using the chunk-level feature sequence.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 6 is a view illustrating an action classification unit according to an embodiment of the present invention;

DETAILED DESCRIPTION OF EXEMPLARY EMBODIMENTS

Figure 1:
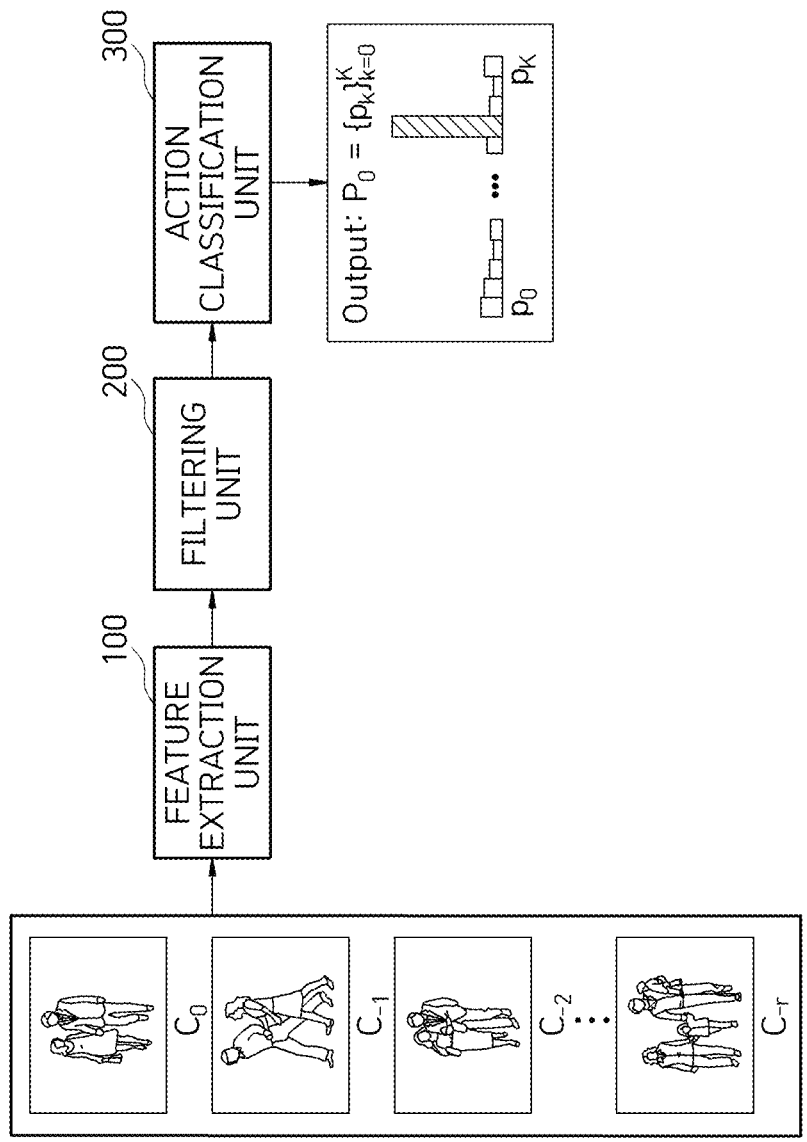
FIG. 1 is a view illustrating an apparatus for online action detection according to an embodiment of the present invention.

Hereinafter, the above and other objectives, advantages, and features of the present invention and ways of achieving them will become readily apparent with reference to descriptions of the following detailed embodiments in conjunction with the accompanying drawings However, the present invention is not limited to such embodiments and may be embodied in various forms. The embodiments to be described below are provided only to assist those skilled in the art in fully understanding the objectives, configurations, and the effects of the invention, and the scope of the present invention is defined only by the appended claims.

Meanwhile, terms used herein are used to aid in the explanation and understanding of the embodiments and are not intended to limit the scope and spirit of the present invention. It should be understood that the singular forms "a," "an," and "the" also include the plural forms unless the context clearly dictates otherwise. The terms "comprises," "comprising," "includes," and/or "including," when used herein, specify the presence of stated features, integers, steps, operations, elements, components and/or groups thereof and do not preclude the presence or addition of one or more other features, integers, steps, operations, elements, components, and/or groups thereof.

Before describing the embodiments of the present invention, the background for proposing the present invention will be described first for the sake of understanding of those skilled in the art.

A technology of recognizing an action included in a video according to the related art operates to trim a video on the basis of a start and an end of an action and provide a result of recognizing an action class in a well-trimmed video without including a background that is not an action.

However, most real-world videos are untrimmed videos including a background, and it is difficult to generate a well-trimmed video with only a part including an action.

According to the related art, deep learning-based action detection technologies have been proposed that, in order to detect an action in an untrimmed video file, generates a video segment in a sliding window method from the entire video segment, trains a network of determining whether the segment is a proposal including an action to provide an action proposal score, and performs an action class classification network on the segments having a high action proposal score to acquire a reliability of an action class so that an action class of a concerned video segment is recognized.

Since the related art uses an untrimmed video file as an input, a start point and an end point of an action interval are identified using information about the entire video segment.

However, online action detection technology in a streaming video is required to detect an action at the current point in time using visual information from a previous time to a current time, rather than the entire video, in particular, using visual information that includes background information, such as in an untrimmed video, but corresponds to only a part rather than the entirety.

Therefore, in order to perform online action detection in a streaming video, there is a need to filter visual information related to a current action among pieces of visual information received as an input that from a previous time and a current time and perform temporal modeling on the action.

The present invention is proposed to obviate the above-described limitations and provides an apparatus and method for online action detection that, in order to perform sophisticated temporal action modeling for action detection in an untrimmed streaming video including a background, performs filtering to emphasize related visual information while ignoring unrelated visual information so that visual information related to a current action in an input video segment may be used to detect the current action.

FIG. 1 is a view illustrating an apparatus for online action detection according to an embodiment of the present invention.

The apparatus for online action detection according to the embodiment of the present invention is characterized as including a feature extraction unit 100 configured to extract a chunk-level feature of a video chunk sequence of a streaming video, a filtering unit 200 configured to perform filtering on the chunk-level features, and an action classification unit 300 configured to classify an action class using the filtered chunk-level features.

By the nature of streaming videos, a video only from a previous time to a current time is usable as an input.

According to an embodiment of the present invention, a video segment from a previous time to a current time to be processed is divided into video chunks of the same length, and an action class at the current point in time is detected using T chunks of the previous time and one chunk of the current time for a total of T+1 chunks.

The feature extraction unit 100 includes a video frame extraction unit 110 configured to extract frames from a video segment, a single chunk feature generation unit 120 configured to generate a single chunk feature for each chunk, and a chunk-level feature extraction unit 130 configured to generate a chunk-level feature sequence using the single chunk feature.

The video frame extraction unit 110 divides a video segment from a previous time to a current time to be processed into video chunks of the same length and extracts frames from a video segment corresponding to a preset number of chunks.

The video frame extraction unit 110 extracts each frame from the video segment or extracts a red-green-blue (RGB) frame or a flow frame through sampling.

The filtering unit 200 performs filtering using relevance between a chunk-level feature and an action instance.

The filtering unit 200 receives the chunk-level feature sequence and infers a relation of an action instance represented by a current chunk and other chunks to generate a filtered chunk-level feature sequence to be used for action classification.

The filtering unit 200 predicts an action relevance of each chunk with the current point in time so as to generate filtered features in which a feature of a chunk related to the current point in time is emphasized and a feature of a chunk unrelated to the current point in time is filtered out.

The action classification unit 300 acquires an action class probability for an input chunk sequence.

The action classification unit 300 receives the filtered chunk-level feature sequence and outputs the action class probability of the current point in time for each class including an action class and a background.

Figure 2:
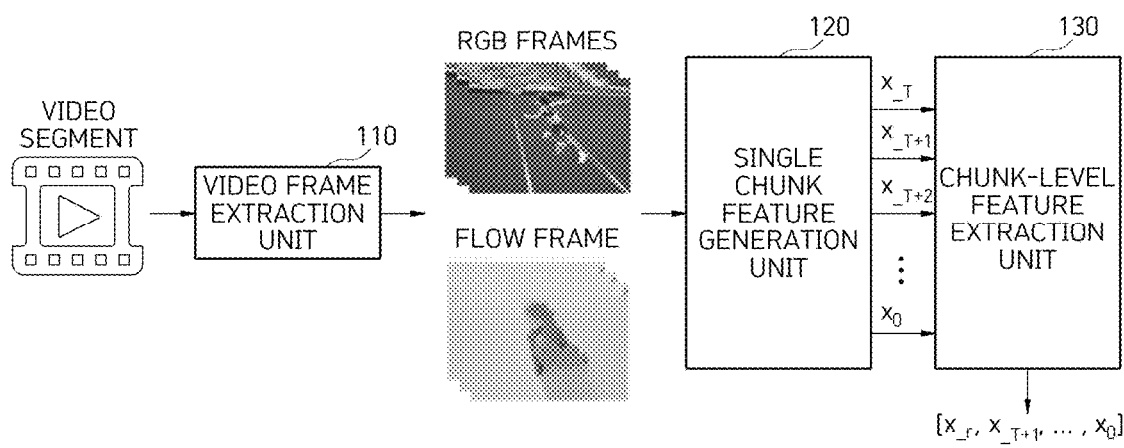
FIG. 2 is a view illustrating a feature extraction unit according to an embodiment of the present invention.

FIG. 2 is a view illustrating a feature extraction unit according to an embodiment of the present invention.

Referring to FIG. 2, the video frame extraction unit 110 of the feature extraction unit 100 extracts each frame from a video segment corresponding to T+1 chunks or extracts a RGB frame or a flow frame through sampling, and the single chunk feature generation unit 120 generates single chunk features of the respective chunks, and the chunk-level feature extraction unit 130 generates a chunk-level feature sequence using the T+1 single chunk features.

Figure 3:
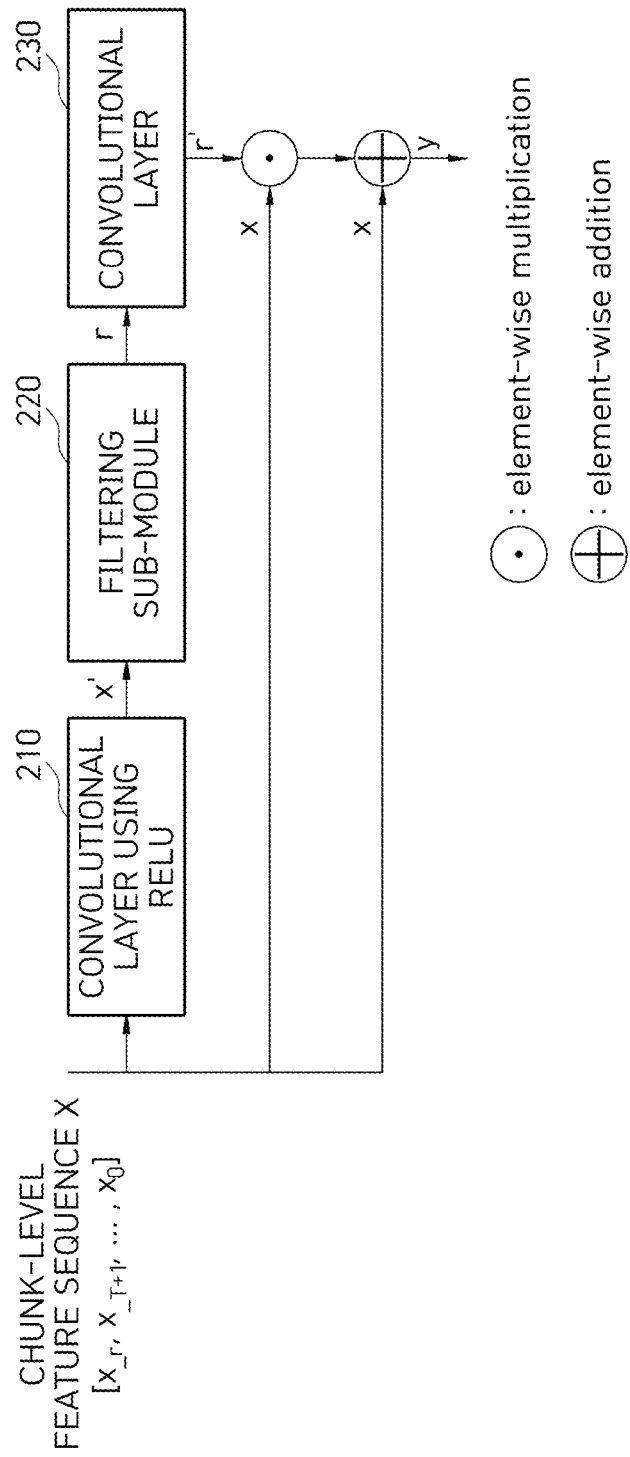
FIG. 3 is a view illustrating a filtering unit according to an embodiment of the present invention.

FIG. 3 is a view illustrating a filtering unit according to an embodiment of the present invention.

A filtering sub-module 220 of the filtering unit 200 receives a chunk level feature sequence, infers a relation between an action instance represented by the current chunk and other chunks, and combines the chunk-level feature sequence, which is assigned an attention on the basis of the relevance, with the original chunk-level feature sequence to generate a filtered chunk-level feature sequence to be used for action classification.

Figure 4:
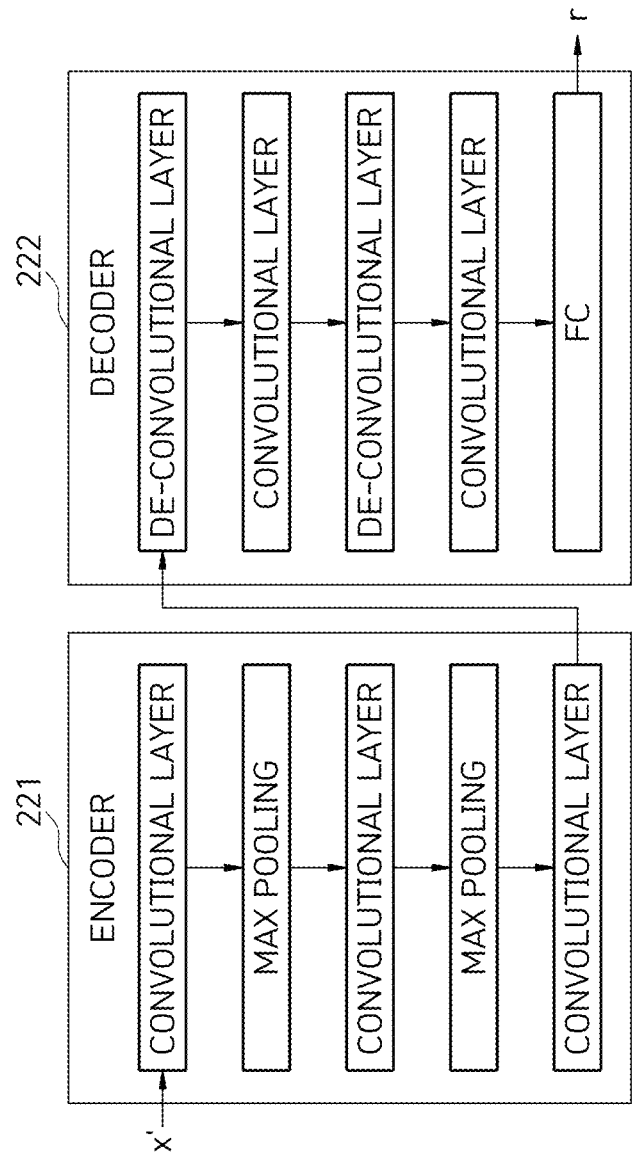
FIG. 4 is a view illustrating a filtering sub-module according to an embodiment of the present invention.

FIG. 4 is a view illustrating an example of a neural network of the filtering sub-module 220 that is embodied in a style of an encoder 221 and a decoder 222 according to an embodiment of the present invention.

FIG. 5 shows views illustrating a relevance ground-truth according to a current point in time according to an embodiment of the present invention.

Figure 5A:
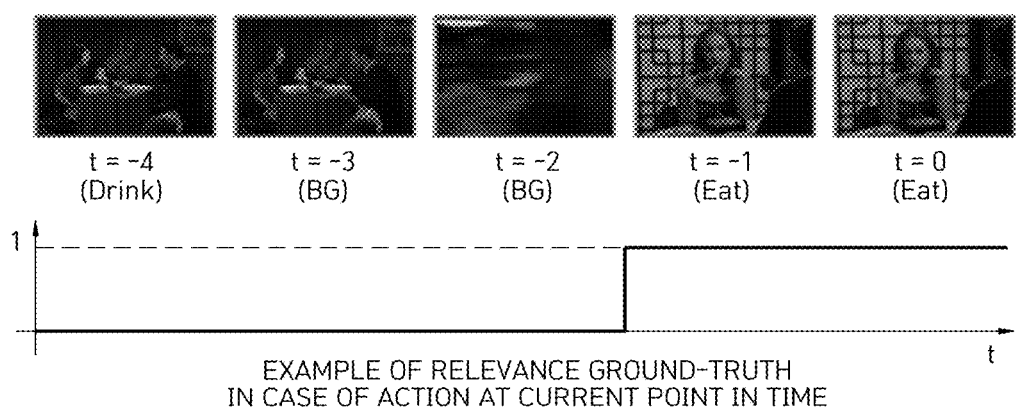
FIGS. 5A and 5B show views illustrating a relevance ground-truth according to a current point in time according to an embodiment of the present invention.
Figure 5B:
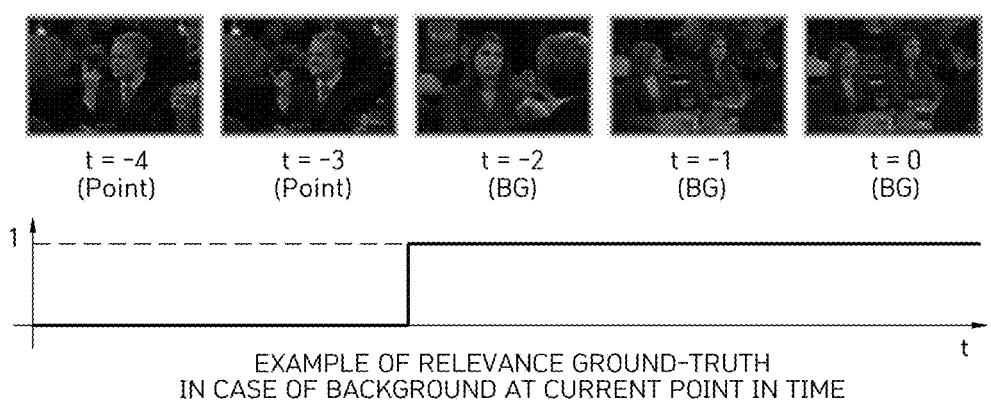

Referring to FIGS. 5A and 5B, an example of configuring a learning sample for training a neural network that implements the filtering unit 200 according to the embodiment of the present invention is illustrated.

As shown in FIG. 5A, when the current point in time corresponds to an action instance of a specific class, 1 is given in the case of the same instance, and 0 is given in a case of being included in another action instance or in the case of a background.

As shown in FIG. 5B, when the current point in time corresponds to a background, 1 is given in the case of a subsequent background, and 0 is given in the case of action instances.

FIG. 6 is a view illustrating an action classification unit according to an embodiment of the present invention.

Referring to FIG. 6, an example of a neural network for receiving a filtered chunk-level feature sequence generated by the filtering unit 200 according to the embodiment of the present invention and outputting the probability of the current point in time for each class of K+1 chunks including an action class and a background is illustrated.

Figure 7:
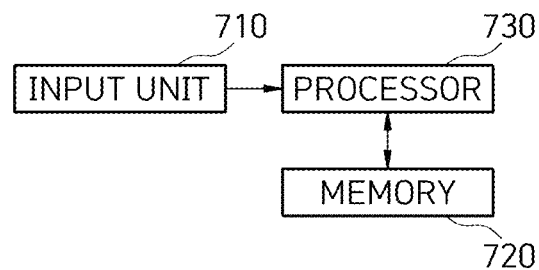
FIG. 7 is a view illustrating an apparatus for online action detection according to an embodiment of the present invention.

FIG. 7 is a view illustrating an apparatus for online action detection according to an embodiment of the present invention.

The apparatus for online action detection according to the embodiment of the present invention includes an input unit 710 for receiving a video chunk sequence of a streaming video, a memory 720 in which a program for detecting an action using the video chunk sequence is stored, and a processor 730 for executing the program. The processor 730 is characterized as extracting chunk level features for the video chunk sequence, filtering the chunk-level features to generate a chunk-level feature sequence to be used for action classification, and classifying an action class and outputting an action class probability using the chunk-level feature sequence.

The processor 730 extracts frames from a video segment corresponding to chunks, generates a single chunk feature for each chunk, and generates a chunk-level feature sequence using the single chunk feature.

The processor 730 infers a relation between an action instance represented by the current chunk and other chunks using the chunk-level feature sequence so as to generate a chunk-level feature sequence.

The processor 730 outputs an action class probability of the current point in time for each class including an action class and a background using the chunk-level feature sequence.

Figure 8:
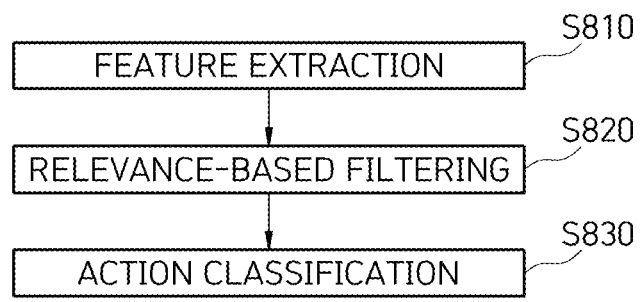
FIG. 8 is a view illustrating a method of online action detection according to an embodiment of the present invention.

FIG. 8 is a view illustrating a method of online action detection according to an embodiment of the present invention.

The method of online action detection according to the embodiment of the present invention is characterized as including extracting a chunk level feature of a video chunk sequence of a streaming video (S810), performing filtering on the chunk level feature (s820), and classifying an action class and outputting an action class probability using the filtered chunk level feature.

In operation S810, frames are extracted from a video segment, a single chunk feature for each chunk is generated, and a chunk level feature sequence is generated using the single chunk features.

In operation S810, a video segment from a previous time to a current time is divided into video chunks of the same length, and each frame is extracted from the video segment corresponding to a preset number of chunks or extracting frames through sampling.

In operation S820, the filtering is performed using relevance between the chunk level feature and an action instance.

In operation S820, the chunk level feature sequence is received to infer a relation of an action instance represented by a current chunk and other chunks to generate a filtered chunk level feature sequence to be used for action classification.

In operation S830, the filtered chunk level feature sequence is received to output the action class probability of the current point in time for each class including the action class and a background.

Meanwhile, the method of online action detection according to the embodiment of the present invention may be implemented in a computer system or may be recorded on a recording medium. The computer system may include at least one processor, a memory, a user input device, a data communication bus, a user output device, and a storage. The above-described components perform data communication through the data communication bus.

The computer system may further include a network interface coupled to a network. The processor may be a central processing unit (CPU) or a semiconductor device for processing instructions stored in the memory and/or storage.

The memory and the storage may include various forms of volatile or nonvolatile media. For example, the memory may include a read only memory (ROM) or a random-access memory (RAM).

Accordingly, the method of online action detection according to the embodiment of the present invention may be implemented in a computer-executable form. When the method of online action detection according to the embodiment of the present invention is performed by the computer, instructions readable by the computer may perform the method of online action detection according to the embodiment of the present invention.

Meanwhile, the method of online action detection according to the embodiment of the present invention may be embodied as computer readable code on a computer-readable recording medium. The computer-readable recording medium is any recording medium that can store data that can be read by a computer system. Examples of the computer-readable recording medium include a ROM, a RAM, a magnetic tape, a magnetic disk, a flash memory, an optical data storage, and the like. In addition, the computer-readable recording medium may be distributed over network-connected computer systems so that computer readable code may be stored and executed in a distributed manner.

As is apparent from the above, in consideration that not only a related chunk but also an unrelated chunk, such as a background or a different action instance, is included in a chunk sequence, a filtered chunk-level feature sequence is derived from the chunk sequence on the basis of relevance, thereby increasing the online action detection performance for prediction of the current action.

The effects of the present invention are not limited to those described above, and other effects not mentioned above will be clearly understood by those skilled in the art from the above detailed description.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system (OS) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors.

Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous.

In addition, it should not be understood as requiring a separation of various apparatus components in the above described example embodiments in all example embodiments, and it should be understood that the above-described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

What is claimed is:

1. An apparatus for online action detection, the apparatus comprising:
   a feature extraction unit configured to extract a chunk-level feature of a video chunk sequence of a streaming video;
   a filtering unit configured to perform filtering on the chunk-level features; and
   an action classification unit configured to classify an action class using the filtered chunk-level features, wherein
   the filtering unit configured to receive a chunk-level feature sequence and infer a relation of an action instance represented by a current chunk and other chunks to generate a filtered chunk-level feature sequence to be used for action classification, and
   the filtering unit configured to predict an action relevance of each chunk with the current point in time so as to generate filtered features in which a feature of a chunk related to the current point in time is emphasized and a feature of a chunk unrelated to the current point in time is filtered out.

2. The apparatus of claim 1, wherein the feature extraction unit includes:
   a video frame extraction unit configured to extract frames from a video segment;
   a single chunk feature generation unit configured to generate a single chunk feature for each chunk; and
   a chunk-level feature extraction unit configured to generate the chunk-level feature sequence using the single chunk features.

3. The apparatus of claim 2, wherein the video frame extraction unit divides a video segment from a previous time to a current time to be processed into video chunks of the same length and extracts frames from the video segment corresponding to a preset number of the chunks.

4. The apparatus of claim 3, wherein the video frame extraction unit extracts each frame from the video segment or extracts a red-green-blue (RGB) frame or a flow frame through sampling.

5. The apparatus of claim 1, wherein the action classification unit acquires an action class probability for a current action included in the input video segment.

6. The apparatus of claim 5, wherein the action classification unit receives the filtered chunk-level feature sequence and outputs the action class probability of a current action for each class including action classes and a background.

7. A method of online action detection, the method comprising the steps of:

(a) extracting a chunk-level feature of a video chunk sequence of a streaming video;
(b) performing filtering on the chunk-level features of the input video segment; and
(c) classifying an action class and outputting an action class probability using the chunk-level features filtered in the step (b), wherein
the step (b) includes performing the filtering using relevance between the chunk-level feature and an action instance,
the step (b) includes receiving the chunk-level feature sequence and inferring a relation of an action instance represented by a current chunk and other chunks to generate a filtered chunk-level feature sequence to be used for action classification, and
the step (b) includes predicting an action relevance of each chunk with the current point in time so as to generate filtered features in which a feature of a chunk related to the current point in time is emphasized and a feature of a chunk unrelated to the current point in time is filtered out.

8. The method of claim 7, wherein the step (a) includes extracting frames from a video segment, generating a single chunk feature for each chunk, and generating a chunk-level feature sequence using the single chunk features.

9. The method of claim 8, wherein the step (a) includes dividing a video segment from a previous time to a current time into video chunks of the same length and extracting each frame from the video segment corresponding to a preset number of the chunks or extracting frames through sampling.

10. The method of claim 7, wherein the step (c) includes receiving the filtered chunk-level feature sequence and outputting the action class probability of a current point in time for each class including the action class and a background.

11. An apparatus for online action detection, comprising:
   an input unit configured to receive a video chunk sequence of a streaming video;
   a memory in which a program for detecting an action using the video chunk sequence is stored; and
   a processor configured to execute the program,
   wherein the processor extracts a chunk-level feature of the video chunk sequence, performs filtering on the chunk-level feature to generate a chunk-level feature sequence to be used for action classification, and classifies an action class and outputs an action class probability using the chunk-level feature sequence, wherein
   the processor configured to infer a relation of an action instance represented by a current chunk and other chunks to generate a filtered chunk-level feature sequence to be used for action classification, and
   the processor configured to predict an action relevance of each chunk with the current point in time so as to generate filtered features in which a feature of a chunk related to the current point in time is emphasized and a feature of a chunk unrelated to the current point in time is filtered out.

12. The apparatus of claim 11, wherein the processor outputs the action class probability of a current point in time for each class including the action class and a background using the chunk-level feature sequence.

* * * * *